(12) United States Patent
Moon et al.

(10) Patent No.: US 9,272,909 B2
(45) Date of Patent: Mar. 1, 2016

(54) POROUS CARBON PARTICLE AND PRODUCING METHOD OF THE SAME

(71) Applicant: Sogang University Research Foundation, Seoul (KR)

(72) Inventors: Jun Hyuk Moon, Seoul (KR); Hae Min Yoo, Bucheon-si (KR); Da Young Kang, Incheon (KR)

(73) Assignee: Sogang University Research Foundation, Seoul (KR)

(*) Notice: Subject to any disclaimer, the term of this patent is extended or adjusted under 35 U.S.C. 154(b) by 44 days.

(21) Appl. No.: 14/163,685

(22) Filed: Jan. 24, 2014

(65) Prior Publication Data

US 2014/0205531 A1 Jul. 24, 2014

Related U.S. Application Data

(63) Continuation of application No. PCT/KR2012/005793, filed on Jul. 20, 2012.

(30) Foreign Application Priority Data

Jul. 26, 2011 (KR) ........................ 10-2011-0074015

(51) Int. Cl.
*C01B 31/02* (2006.01)
*H01B 1/04* (2006.01)

(52) U.S. Cl.
CPC *C01B 31/02* (2013.01); *H01B 1/04* (2013.01); *Y02E 10/542* (2013.01); *Y02P 70/521* (2015.11)

(58) Field of Classification Search
CPC ...................................................... C01B 31/02
See application file for complete search history.

(56) References Cited

U.S. PATENT DOCUMENTS

| 4,263,268 | A | 4/1981 | Knox et al. | 423/445 R |
|---|---|---|---|---|
| 7,700,157 | B2 * | 4/2010 | Bronikowski et al. | 427/249.1 |
| 2006/0057051 | A1 * | 3/2006 | Dai et al. | 423/445 R |

FOREIGN PATENT DOCUMENTS

| JP | 2003-327473 | 11/2003 |
|---|---|---|
| KR | 10-0574030 | 4/2006 |
| KR | 10-0924214 | 10/2009 |

OTHER PUBLICATIONS

International Search Report issued in International App. No. PCT/KR2012/005793, mailed Jan. 28, 2013.

* cited by examiner

*Primary Examiner* — Stuart Hendrickson
(74) *Attorney, Agent, or Firm* — Greer Burns & Crain Ltd.

(57) ABSTRACT

The present disclosure relates to a porous carbon particle of which a pore size can be controlled by using a copolymer that allows selective cross-linking of a polymer particle and selective carbonization of a polymer particle, and a producing method of the porous carbon particle and a photo electrode including a porous layer containing the porous carbon particle and a dye-sensitized solar cell including the photo electrode.

10 Claims, 5 Drawing Sheets

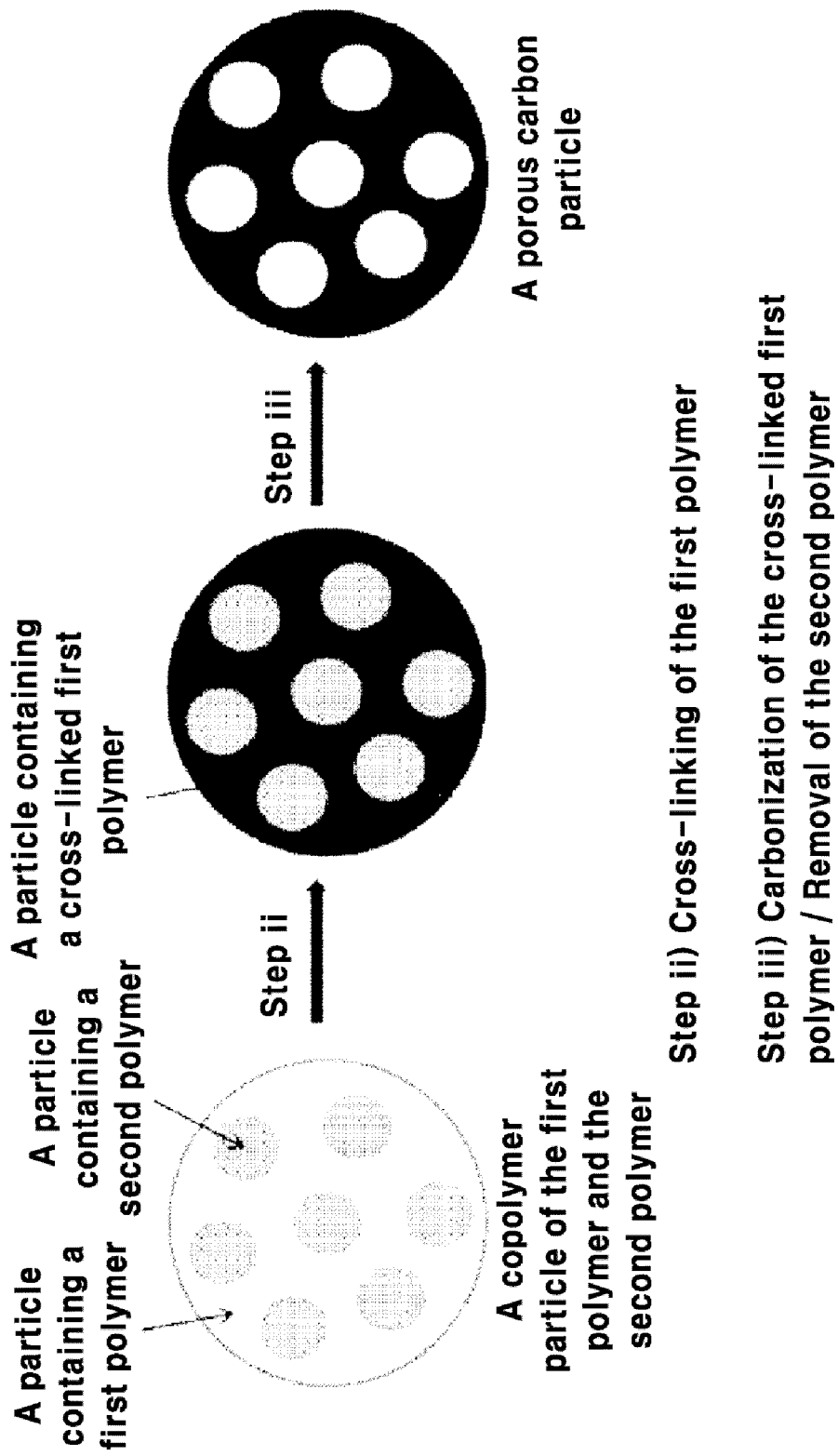

POROUS CARBON PARTICLE AND
PRODUCING METHOD OF THE SAME

CROSS-REFERENCE TO RELATED
APPLICATION

This application is a continuation of International Application No. PCT/KR2012/005793 filed on Jul. 20, 2012, claiming the priority based on Korean Patent Application No. 10-2011-0074015 field on Jul. 26, 2011, the contents of all of which are incorporated herein by reference in their entirety.

TECHNICAL FIELD

The various embodiments described herein pertain generally to a porous carbon particle and a producing method thereof.

BACKGROUND

Porous particles or pores of porous structures may be classified into three types based on their diameters: micro pores (less than 2 nm), meso pores (ranging from 2 nm to 50 nm) and macro pores (more than 50 nm). These porous particles capable of controlling pore sizes thereof are recently attracting attention, for they can be used in various fields including a catalyst, a separation system, a low-dielectric material, a hydrogen storage material, a photonic crystal, an electrode, etc.

The porous particles or porous structures can be produced by using various materials such as a metal oxide, a semiconductor, a metal, a polymer or carbon. Especially, a porous carbon particle has many advantages such as excellent surface characteristic, ion conductivity, corrosion resistance, low manufacturing cost, etc, and, thus, has wide range of applications to various fields.

However, the efficiency of the porous carbon particle may greatly differ depending on a distribution, a size, connectivity, a surface area, a surface characteristic of pores included in the porous carbon particle. Especially, the size of the pores needs to be controlled depending on the purposes of using the porous carbon particle. For example, in case of using a porous carbon particle for an electrode of a fuel cell, if a pore size of the porous carbon particle is excessively small, transport and diffusion of a reactant gas or the like may become difficult and an effect of using a catalyst may be degraded because polymer electrolyte cannot reach the inside of pores, though an impregnation amount of a catalyst material may be increased due to an increase of a specific surface area. Thus, ultimately, it may be impossible to produce a fuel cell having an improved performance.

Meanwhile, conventionally, it has been proposed using a template to produce the porous carbon particle. For example, a spherical silica or a colloidal crystalline array based on aligned agglomerates of latex polymer nanoparticles has been used as the template. For example, Korean Patent Application No. 10-2003-0087761 describes "Electrocatalysts for fuel cell supported by porous carbon structure having 3-dimensionally regularly arranged spherical pores of uniform diameter and their preparation method." Specifically, this document describes a method of producing a porous carbon particle by using a template. Further, recently, there has been made efforts to synthesize a porous carbon particle including regularly arranged pores by template duplication using zeolite, a mesoporous material and a colloidal crystal. However, it has been observed that pores are not regularly arranged or distributed in porous carbon particles produced by using these conventional methods, and it has been impossible to control the size of the pores to be suitable for the purposes of usage. Further, in the conventional methods of producing the porous carbon particles by using the template, it has been difficult to simplify the production process and reduce cost.

In order to solve the aforementioned problems of the conventional methods of producing a porous carbon particle by using a template, the present inventors have found out that it is possible to produce a porous carbon particle while controlling a pore size easily by using a copolymer that allows selective cross-linking of a polymer particle and selective carbonization of a polymer particle. Based on this observation, the present inventors have reached the present disclosure.

SUMMARY

In view of the foregoing problems, illustrative embodiments provide a method for producing a porous carbon particle by using a copolymer that allows selective cross-linking of a polymer particle and selective carbonization of a polymer particle. The illustrative embodiments also provide a porous carbon particle produced by this method.

However, the problems sought to be solved by the present disclosure are not limited to the above description and other problems can be clearly understood by those skilled in the art from the following description.

In a first aspect of an illustrative embodiment, there is provided a producing method of a porous carbon particle, including:

i) the step of forming a copolymer particle including a particle containing a first polymer in which at least one particle containing a second polymer is included;

ii) the step of cross-linking the first polymer contained in the copolymer particle; and iii) the step of carbonizing the cross-linked first polymer and selectively removing the second polymer.

In a second aspect of the illustrative embodiment, there is provided a porous carbon particle prepared by the producing method according to the first aspect of an illustrative embodiment.

In accordance with the illustrative embodiment, by forming a porous carbon particle through the steps of forming a copolymer particle including a particle containing a first polymer in which at least one particle containing a second polymer is included, cross-linking the first polymer, and carbonizing the cross-linked polymer and selectively removing the second polymer, it is possible to produce the porous carbon particle easily through an economic process in a short period of time.

Further, since the porous carbon particle produced in accordance with the illustrative embodiment includes a great number of pores, a large specific surface area can be provided. Further, by adjusting the kinds and concentrations of the monomers forming the copolymer, it is possible to control the size and the distribution of the pores appropriately depending on the purposes of producing the porous carbon particle. The porous carbon particle in accordance with the illustrative embodiment of the present disclosure may have a wide range of applications to various fields such as a catalyst, a photocatalyst, an electrode, a photoelectrode, a sensor, an optical sensor, a photoelectric device, a nanodevice.

BRIEF DESCRIPTION OF THE DRAWINGS

In the detailed description that follows, embodiments are described as illustrations only since various changes and modifications will become apparent from the following detailed description. The use of the same reference numbers in different figures indicates similar or identical items.

FIG. 1 is a flowchart for describing a process of producing a porous carbon particle in accordance with an illustrative embodiment of the present disclosure;

DETAILED DESCRIPTION

Figure 2A:
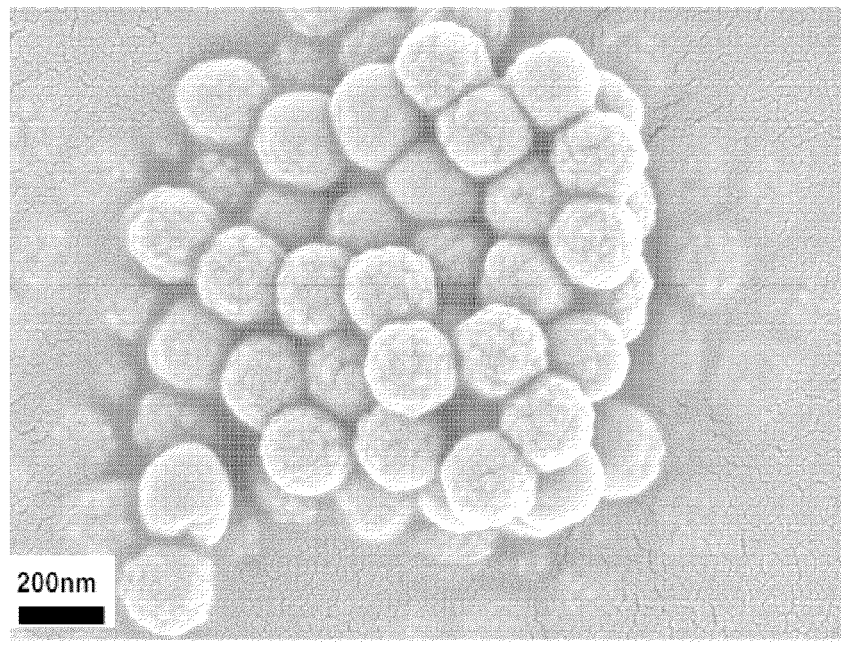
FIG. 2A is a SEM (scanning electron microscope) image of a copolymer (PS-PMMA) in accordance with an example of the illustrative embodiment.

Hereinafter, illustrative embodiments will be described in detail so that inventive concept may be readily implemented by those skilled in the art. However, it is to be noted that the present disclosure is not limited to the illustrative embodiments and examples but can be realized in various other ways. In drawings, parts not directly relevant to the description are omitted to enhance the clarity of the drawings, and like reference numerals denote like parts through the whole document.

Through the whole document, the term "comprises or includes" and/or "comprising or including" used in the document means that one or more other components, steps, operation and/or existence or addition of elements are not excluded in addition to the described components, steps, operation and/or elements unless context dictates otherwise.

The term "about or approximately" or "substantially" are intended to have meanings close to numerical values or ranges specified with an allowable error and intended to prevent accurate or absolute numerical values disclosed for understanding of the present disclosure from being illegally or unfairly used by any unconscionable third party. Through the whole document, the term "step of" does not mean "step for".

Through the whole document, the term "A and/or B" means "A or B" or "A and B."

Through the whole document, the term "on" that is used to designate a position of one element with respect to another element includes both a case that the one element is adjacent to the another element and a case that any other element exists between these two elements.

Through the whole document, the term "combination of" included in Markush type description means mixture or combination of one or more components, steps, operations and/or elements selected from the group consisting of components, steps, operation and/or elements described in Markush type and thereby means that the disclosure includes one or more components, steps, operations and/or elements selected from the Markush group.

Hereinafter, illustrative embodiments and examples will be described in detail with reference to the accompanying drawings, which form a part hereof.

In accordance with one aspect of the present disclosure, a producing method of a porous carbon particle includes: i) the step of forming a copolymer particle including a particle containing a first polymer in which at least one particle containing a second polymer is included; ii) the step of cross-linking the first polymer contained in the copolymer particle; and iii) the step of carbonizing the cross-linked first polymer and selectively removing the second polymer.

In accordance with the present disclosure, the first polymer is selectively cross-linked and carbonized by using the copolymer particle, and pores are formed by selectively removing only the second polymer formed in the first polymer. Thus, it is possible to easily produce a carbon particle having an enlarged specific surface area and an improved porosity.

FIG. 1 is a flowchart for describing a process of producing a porous carbon particle in accordance with an illustrative embodiment.

Referring to FIG. 2, in an illustrative embodiment, the copolymer particle including the particle containing the first polymer in which at least one particle containing the second polymer may be produced by copolymerizing a monomer for the formation of the first polymer and a monomer for the formation of the second polymer. The particle containing the first polymer may refer to a domain in which the first polymer is contained much more than the second polymer, and the particle containing the second polymer may refer to a domain in which the second polymer is contained much more than the first polymer, but not limited thereto.

In accordance with an illustrative embodiment, the first polymer may be formed by polymerization of an aromatic monomer, but not limited thereto. By way of example, the aromatic monomer may include a member selected from the group consisting of styrene, benzamide, butyleneterephthalate, ethyleneterephthalate, and combinations thereof, but not limited thereto.

In accordance with an illustrative embodiment, the second polymer may be formed by polymerization of a non-aromatic monomer, but not limited thereto. By way of example, the non-aromatic monomer may include a member selected from the group consisting of methylmethacrylate, acrylate, acrylamide, acrylonitrile, ethylene, vynil halide, propylene, butylene, and combinations thereof, but not limited thereto.

In accordance with an illustrative embodiment, the step i) includes a radical-polymerization of a mixture of a monomer forming the first polymer and a monomer forming the second polymer to form the copolymer particle, but not limited thereto. The radical-polymerization implies a polymerization reaction that progresses in a free radical state in which an atom positioned at the end of a generated polymer has a free electron. The radical polymerization may include, but not limited to, an emersion polymerization method and a dispersion polymerization method.

In accordance with the illustrative embodiments of the first aspect of the present disclosure, as stated above, the copolymer particle including both of the aromatic monomer and the non-aromatic monitor is formed in the step i) to selectively cross-link only the first polymer containing the aromatic monomer when using Friedel-Crafts alkylation reaction for the formation of the cross-linking in the step ii), which is performed after the step i), but not limited thereto.

In accordance with an illustrative embodiment, the step ii) may include cross-linking the first polymer contained in the copolymer particle by Friedel-Crafts alkylation reaction, but not limited thereto. By way of example, the Friedel-Crafts alkylation reaction may be performed by using an alkyl halide under the presence of a Lewis acid catalyst such as aluminum halide or iron halide, but not particularly limited thereto. The Lewis acid, the alkyl halide, the conditions for the Friedel-Crafts alkylation reaction may be appropriately selected from those commonly known in the art by a person skilled in the art.

The Friedel-Crafts alkylation is a reaction for obtaining an alkylated product through an electrophilic aromatic substitution reaction under the presence of a Lewis acid catalyst. By way of non-limiting example, the Friedel-Crafts alkylation implies a reaction in which an aromatic compound including an aromatic ring such as a benzene ring makes a reaction under the presence of an alkyl halide and a Lewis acid, thus causing alkylation of the aromatic ring. Through this reaction, a new carbon-carbon coupling is formed at the aromatic ring such as the benzene ring. By way of example, the Friedel-Crafts alkylation reaction may be represented by the following Reaction Formula 1:

[Reaction Formula 1]

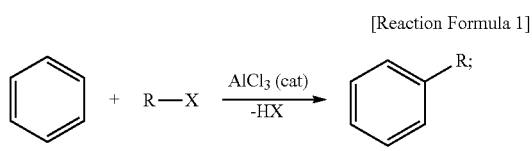

in Reaction Formula 1, $AlCl_3$ is used as a Lewis acid, and, besides $AlCl_3$, various Lewis acids such as $FeCl_3$ may be used. R—X denotes an alkyl halide, and, in general, various alkyl halides known in the pertinent art, such as $CH_3Cl$, $(CH_3)_2HCCl$, $(CH_3)_3CCl$, may be used.

The mechanism of the Friedel-Crafts alkylation reaction may be represented by the following Reaction Formulas 2 and 3, but not limited thereto:

[Reaction Formula 2]

[Reaction Formula 3]

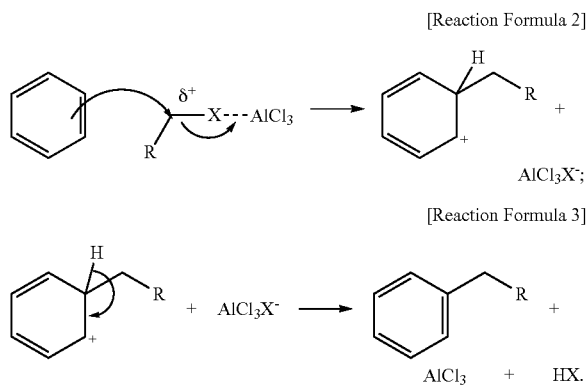

To elaborate, in the Friedel-Crafts alkylation reaction, as indicated by Reaction Formula 2, an alkyl halide and a Lewis acid such as $AlCl_3$ react with each other, so that a Lewis acid-base complex is produced. The Lewis acid-base complex contains cations of an alkyl group originated from the alkyl halide. The alkyl cations (i.e., carbonium cations) then may attack the aromatic ring having a sufficient amount of electrons, so that the alkyl group is coupled to the aromatic ring and a cation is obtained. Subsequently, as indicated by Reaction Formula 3, as a hydrogen atom is removed from the cation including the alkyl group coupled to the aromatic ring, an electrophilic aromatic substitution reaction is completed. As a result, the hydrogen atom of the aromatic ring is substituted with the alkyl group, thus creating a new carbon-carbon coupling.

In accordance with an illustrative embodiment, the step iii) includes, by sintering, carbonizing the cross-linked first polymer and selectively removing the second polymer particle, but not limited thereto. A temperature for the sintering may be appropriately selected within a temperature range suitable for carbonizing the cross-linked first polymer depending on the kinds of the polymers. By way of example, the temperature may be set to be in the range from, but not limited to, about 500° C. to about 900° C., about 500° C. to about 800° C., about 500° C. to about 700° C., about 600° C. to about 900° C., about 700° C. to about 900° C., or about 800° C. to about 900° C.

In accordance with an illustrative embodiment, the second polymer particle may be selectively removed by not only the aforementioned sintering process but also by dissolving process using a solvent which is capable of dissolving only the second polymer particle selectively, but not limited thereto. By way of non-limiting example, a solvent having the same or similar solubility parameter (SP) as that of the second polymer may be used as the solvent for dissolving the second polymer. For example, methylene chloride having the similar solubility parameter as that of the PMMA may be used as the solvent. However, the solvent may not be particularly limited as long as it is capable of dissolving the second polymer selectively.

In accordance with a second aspect of the present disclosure, there is provided a porous carbon particle produced by the producing method in accordance with the first aspect of the present disclosure, which includes i) the step of forming a copolymer particle including a particle containing a first polymer in which at least one particle containing a second polymer is included; ii) the step of cross-linking the first polymer contained in the copolymer particle; and iii) the step of carbonizing the cross-linked first polymer and selectively removing the second polymer.

The porous carbon particle in accordance with the present disclosure may have a wide range of applications to various fields such as a catalyst for various uses, a catalyst support, an electrode, a device, a sensor, and so forth.

Below, examples of the illustrative embodiments will be described. However, the following examples are intended to facilitate understanding of the present disclosure and therefore are not intended to limit its scope.

EXAMPLES

1. Production of Porous Carbon Particle

In this example, after a copolymer (PS-PMMA) particle was produced through the process as described in FIG. 1, a porous carbon particle was produced from this copolymer particle (PS-PMMA). In the following, each step of this process will be elaborated. FIG. 1 is a flowchart for describing a process of producing a porous carbon particle in accordance with an illustrative embodiment of the present disclosure.

Step i): Formation of Copolymer (PS-PMMA) Particle

In step i) (not shown in FIG. 1) of this example, a copolymer (PS-PMMA) particle containing polystyrene (PS) as a particle containing the first polymer and polymethyl methacrylate (PMMA) as a particle containing the second polymer was formed.

First, in order to form the copolymer (PS-PMMA) containing a styrene monomer and a methyl methacrylate monomer, 2.1 g of styrene and 0.7 g of methyl methacrylate were injected into a flask, and while increasing a temperature of the flask, nitrogen was also injected into the flask. When the temperature of the flask reached 70° C., 10 mL of aqueous solution, which was prepared by dissolving 0.12 g of potassium persulfate, was injected into the flask. The potassium persulate was used as an initiator that initiates polymerization for an emersion polymerization reaction between the styrene and the methyl methacrylate. Upon the lapse of 3 hours after the potassium persulfate solution was injected, 0.9 g of divinylbenzene was injected into the flask, and polymerization was conducted. Then, after 24 hours passed by, a produced copolymer (PS-PMMA) particle was separated and thus finally acquired. The divinylbenzene was used as a linker that allowed the polystyrene to be cross-linked. The acquired copolymer (PS-PMMA) was in the form in which a multiple number of particles containing polymethyl methacrylate (PMMA) were included in a particle containing polystyrene (PS).

Step ii): Cross-Linking of First Polymer-Containing Particle

In step ii) of this example, in order to selectively cross-link only the polystyrene (PS) contained in the copolymer (PS-PMMA) particle, Friedel-Crafts alkylation reaction was used.

First, to raise a Friedel-Crafts alkylation reaction, a solution was prepared by adding 1.80 g of aluminum chloride as a Lewis acid to 30 mL of chloroform as an alkyl halide. Then, 0.3 g of the copolymer (PS-PMMA) polymerized in the step i) was injected into the solution containing the chloroform and the aluminum chloride and was made to make a reaction therein for 18 hours. As a result, only the polystyrene (PS) contained in the copolymer (PS-PMMA) particle was cross-linked through the Friedel-Crafts alkylation reaction. Upon the completion of the reaction, the solution was refined by a centrifuge and cleaned by using acetone and hydrochloric acid. Thereafter, the acquired copolymer (PS-PMMA) particle was dispersed in water and dried in an oven for 24 hours, so that a cross-linked copolymer (PS-PMMA) particle was obtained. That is, the cross-linked copolymer (PS-PMMA) particle was obtained selectively by cross-linking only the polystyrene (PS) contained in the copolymer (PS-PMMA) particle.

Step iii): Carbonization of First Polymer-Containing Particle and Removal of Second Polymer-Containing Particle In step iii) of this example, sintering was performed to selectively carbonize only the selectively cross-linked polystyrene (PS) in the cross-linked copolymer (PS-PMMA) particle obtained in the step ii) and to selectively remove only the polymethyl methacrylate (PMMA) used as the second polymer particles. The cross-linked copolymer (PS-PMMA) particle containing the selectively cross-linked polystyrene (PS), which was obtained in the step ii), was put into a furnace and uniformly heated to 700° C. while injecting nitrogen into the furnace. Then, after maintaining the temperature of 700° C. for 2 hours, the furnace was cooled to a room temperature, so that the cross-linked polystyrene (PS) was carbonized and the polymethyl methacrylate (PMMA) particle was selectively removed. As a result, a porous carbon particle was obtained.

2. Analysis of Structure of Porous Carbon Particle

Figure 2B:
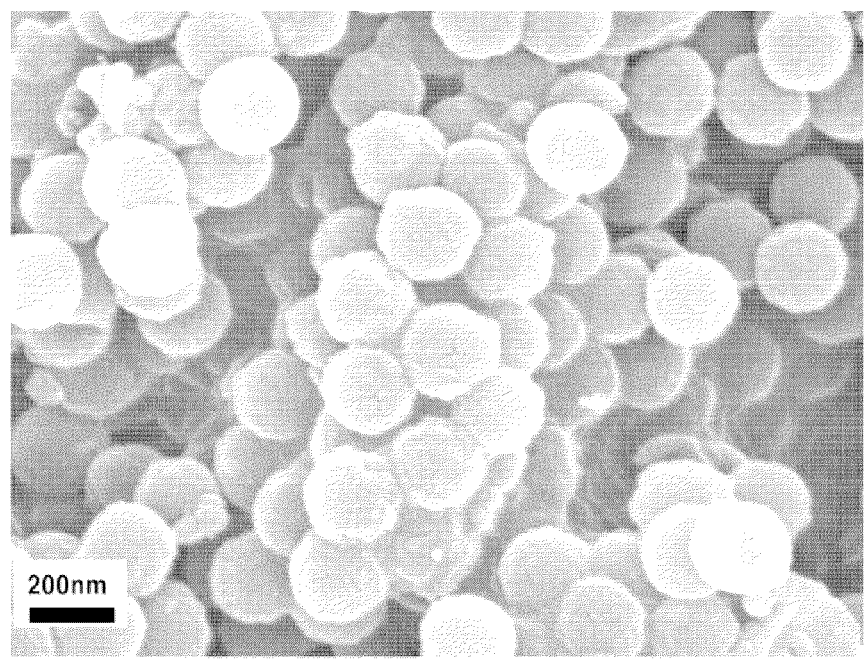
FIG. 2B is a SEM image of a copolymer (PS-PMMA) in which polystyrene (PS) is cross-linked in accordance with the example of the illustrative embodiment.
Figure 3A:
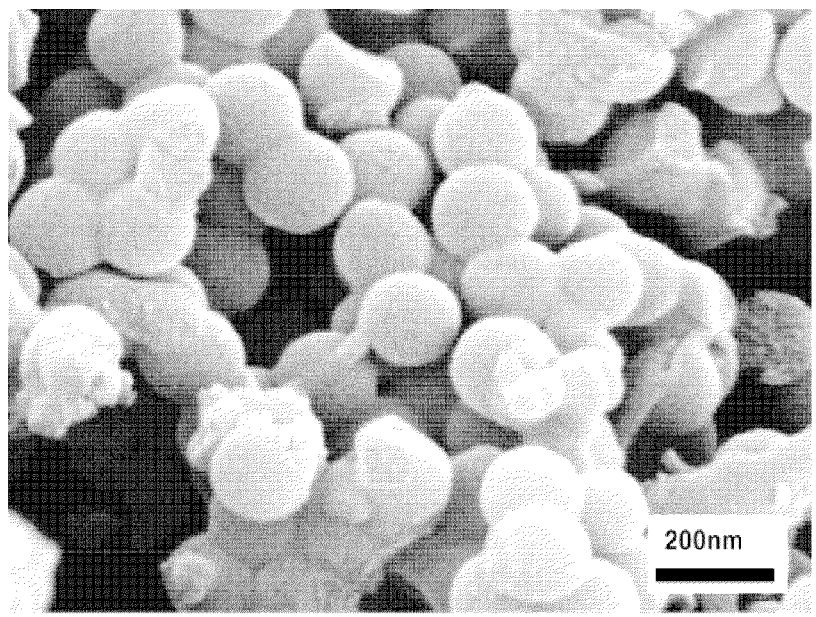
FIG. 3A is a SEM image of a porous carbon particle in accordance with an example of the illustrative embodiment.
Figure 3B:
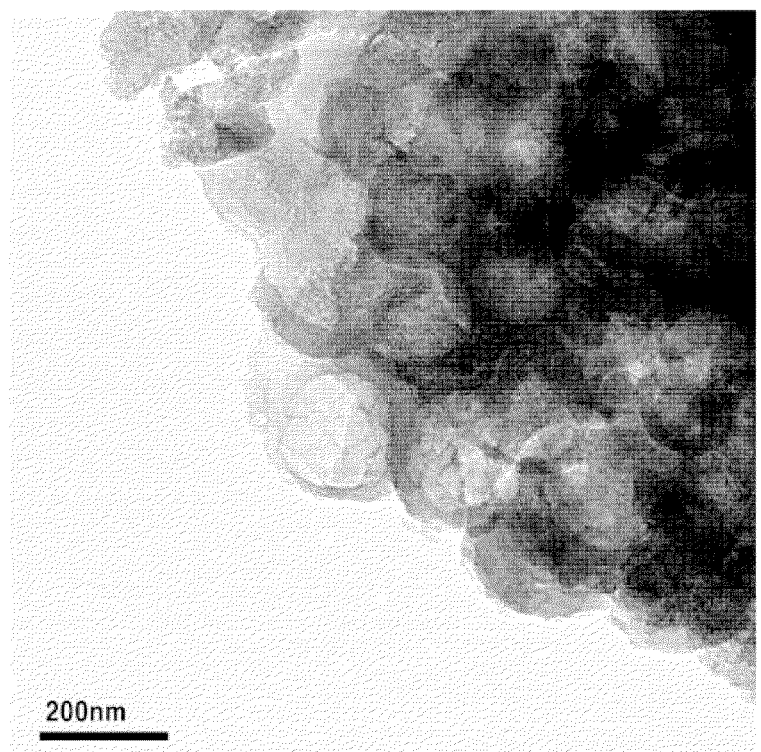
FIG. 3B is a TEM (transmission electron microscope) image of a porous carbon particle in accordance with the example of the illustrative embodiment.

SEM images and/or TEM images of the copolymer (PS-PMMA) particle produced in the step i), the cross-linked copolymer (PS-PMMA) particle obtained in the step ii) and the porous carbon particle obtained in the step iii) were shown in FIG. 2A, FIG. 2B, FIG. 3A and FIG. 3B. Specifically, FIG. 2A is a SEM image of the copolymer (PS-PMMA) particle polymerized in the step i); FIG. 2B, a SEM image of the cross-linked copolymer (PS-PMMA) particle containing the polystyrene (PS) which was cross-linked through the step ii); FIG. 3A, a SEM image of the porous carbon particle obtained through the step iii); and FIG. 3B, a TEM image of the porous carbon particle obtained through the step iii).

3. Analysis of Specific Surface Area of Porous Carbon Particle

In the step i), a porous carbon particle was produced by the same method as stated above except that 1.68 g of styrene and 0.42 g of methyl methacrylate were used. Cyclic voltammetry was used to describe a specific surface area according to pores of the produced porous carbon particle, and an anodic peak current $I_{pa}$ and a cathodic peak current $I_{pc}$ were measured and shown in Table 1 below:

TABLE 1

| Target of Measurement | PS:PMMA (Weight Ratio) | $I_{pa}$ (μA) | $I_{pc}$ (μA) |
|---|---|---|---|
| Comparative Example | 1:0 | −34.3 | 35.6 |
| Example | 4:1 | −40.7 | 53.8 |

Figure 4A:
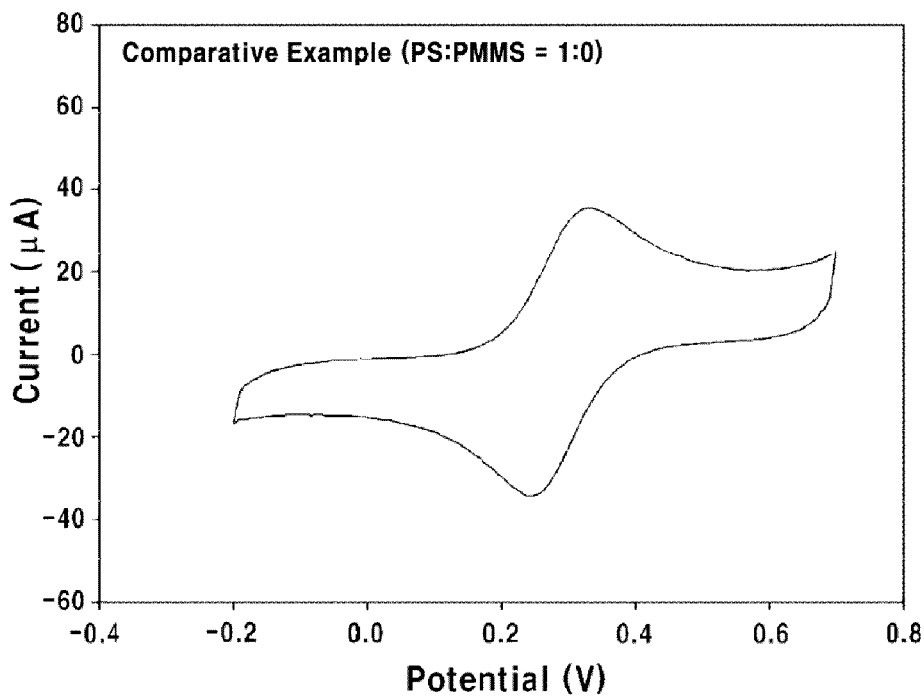
FIG. 4A is a graph showing a CV (Cyclic Voltammogram) of a carbon particle produced by using only polystyrene (PS) in accordance with a comparative example.
Figure 4B:
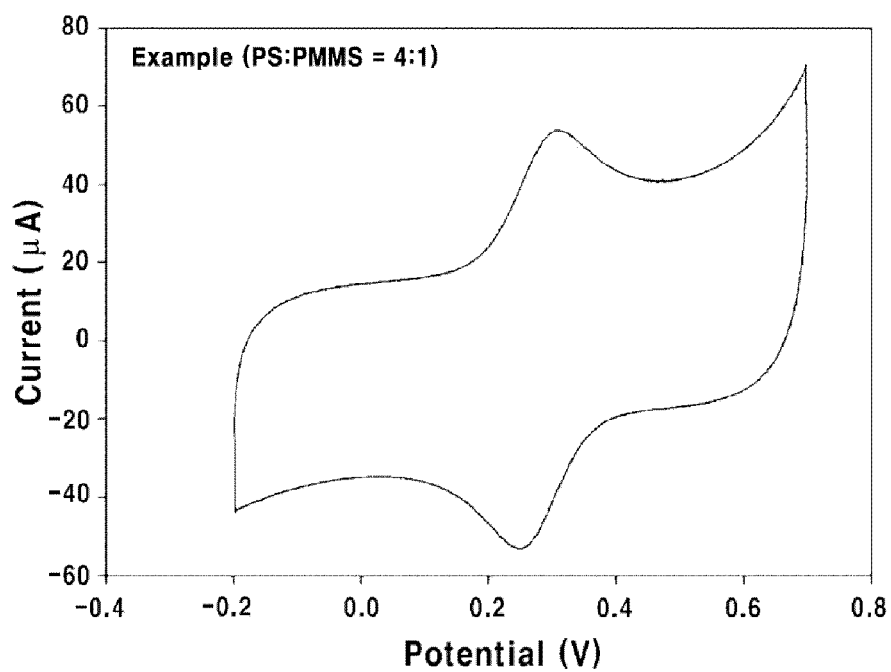
FIG. 4B is a graph showing a CV of a porous carbon particle in accordance with an example of the illustrative embodiment.

As can be seen from Table 1 and FIG. 4A and FIG. 4B showing the measurements of Table 1 as CV graphs, the peak currents in the example (FIG. 4B) of the illustrative embodiment were found to have higher absolute values than those of the peak currents observed in the comparative example (i.e., in case of using only polystyrene without using PMMA, FIG. 4A). Further, the specific surface areas of the porous carbon particles in the comparative example and the example of the illustrative embodiment of Table 1 were specified in Table 2 below:

TABLE 2

| | Comparative Example (PS:PMMA = 1:0) | Example (PS:PMMA = 4:1) |
|---|---|---|
| Specific surface area (m²/g) | 212.9089 | 1134.9323 |

Figure 5:
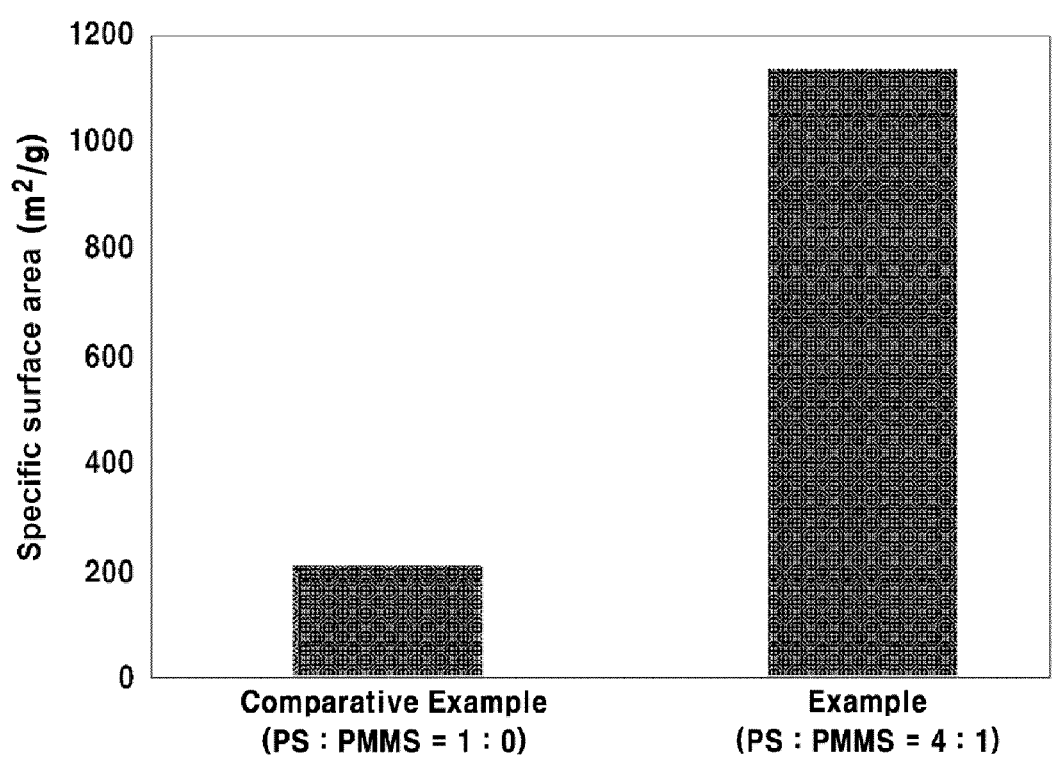
FIG. 5 is a graph showing a specific surface area of a carbon particle produced by using only polystyrene (PS) in accordance with a comparative example and a specific surface area of a porous carbon particle produced in accordance with an example of the illustrative embodiment.

As can be seen from Table 2 and FIG. 5 showing the measurements as graphs, the specific surface area was found to have higher in the example of the illustrative embodiment than in case of the comparative example (i.e., in case of using only polystyrene without using PMMA).

Referring to the above experiment data, i.e., Table 1, Table 2, FIG. 4A, FIG. 4B and FIG. 5, the porous carbon particle produced by forming the copolymer as in the example of the illustrative embodiment was found to have more pores than the porous carbon particle produced by using the homopolymer as in the comparative example. Thus, in accordance with the illustrative embodiment, it is possible to produce a porous carbon particle having an increased specific surface area.

The above description of the illustrative embodiments is provided for the purpose of illustration, and it would be understood by those skilled in the art that various changes and modifications may be made without changing technical conception and essential features of the illustrative embodiments. Thus, it is clear that the above-described illustrative embodiments are illustrative in all aspects and do not limit the present disclosure. For example, each component described to be of a single type can be implemented in a distributed manner. Likewise, components described to be distributed can be implemented in a combined manner.

The scope of the inventive concept is defined by the following claims and their equivalents rather than by the detailed description of the illustrative embodiments. It shall be understood that all modifications and embodiments conceived from the meaning and scope of the claims and their equivalents are included in the scope of the inventive concept.

We claim:

1. A method of producing a porous carbon particle, the method comprising:
   i) a step of forming a copolymer particle comprising a first polymer and at least one second polymer by radical-polymerization of a mixture of a monomer forming the first polymer and a monomer forming the second polymer to form the copolymer particle;
   ii) a step of cross-linking the first polymer contained in the copolymer particle; and
   iii) a step of carbonizing the cross-linked first polymer after the step ii) and selectively removing the second polymer.

2. The method of producing a porous carbon particle of claim 1, wherein the step i) includes forming the first polymer by polymerization of an aromatic monomer.

3. The method of producing a porous carbon particle of claim 2, wherein the aromatic monomer includes a member selected from the group consisting of styrene, benzamide, butyleneterephthalate, ethyleneterephthalate, and combinations thereof.

4. The method of producing a porous carbon particle of claim 1, wherein the step i) includes forming the second polymer by a polymerization of a non-aromatic monomer.

5. The method of producing a porous carbon particle of claim 4, wherein the non-aromatic monomer includes a member selected from the group consisting of methylmethacrylate, acrylate, acrylamide, acrylonitrile, vinyl halide, ethylene, propylene, butylene, and combinations thereof.

6. The method of producing a porous carbon particle of claim 1, wherein the step ii) includes cross-linking the first polymer contained in the copolymer particle by Friedel-Crafts alkylation reaction.

7. The method of producing a porous carbon particle of claim 1, wherein the step iii) includes carbonizing the cross-linked first polymer after the step ii) and removing selectively the second polymer particle, by sintering.

8. The method of producing a porous carbon particle of claim 7, wherein the sintering is performed at a temperature of from about 500° C. to about 900° C.

9. The method of producing a porous carbon particle of claim 1, wherein the second polymer particle is selectively removed by a dissolving process using a solvent.

10. A method of producing a porous carbon particle, the method comprising:
   forming a copolymer particle containing a first polymer and a second polymer;
   cross-linking the first polymer contained in the copolymer particle;
   selectively removing the second polymer from the co-polymer particle by dissolving the second polymer with a solvent; and,
   carbonizing the cross-linked first polymer.

* * * * *